Patented May 29, 1951

2,554,814

UNITED STATES PATENT OFFICE 2,554,814

FILTER MATERIALS AND PROCESS FOR MAKING SUCH MATERIALS

John B. Catlin, Neenah, and John C. Wollwage, Appleton, Wis., assignors to Paper Patents Company, Neenah, Wis., a corporation of Wisconsin No Drawing. Application May 21, 1945, Serial No. 595,066

9 Claims. (Cl. 154—138)

The purpose of the invention is to provide a sheet material from which one may manufacture elements capable of filtering various types of liquids efficiently and economically, which elements will maintain their efficiency over long periods of time and service, and which will not be injuriously affected by contact with the liquid which is being filtered, or by foreign liquids or other materials.

This application is a continuation in part of our previous application for United States Patent Serial No. 529,176, filed April 1, 1944, now abandoned.

Heretofore, it has been proposed to manufacture filter elements of paper or other similar fabrics impregnated or otherwise treated with a resin or other bonding material so as to improve the stability and durability of the filter element. However, so far as we are aware, it has always been believed necessary to use, for this purpose, a paper or similar fabric which has a considerable degree of initial inherent stability before it is impregnated with the bonding agent. Such papers or fabrics have necessarily been quite dense in their structure, which density by the resin treatment has often been so intensified that the efficiency of the filter in terms of filtering capacity or flow rate has been relatively low.

We have discovered that a very stable, efficient, and durable filtering element can be manufactured from relatively porous or "open" sheets of very light-weight paper stock such as creped tissue of various types, if a sufficient number of plies of such material be employed, and if the manufacture of the filter sheet be conducted in such manner that the steps of impregnating or loading with resin, followed by the subsequent treatment do not unduly reduce the bulk and concomitant porosity of the structure.

Various grades and types of tissue are usable with advantage in carrying out our invention. For example, we can use several plies of material such as is employed for making facial tissues (having a dryer basis weight of 8 to 10 lbs. per 2880 sq. ft. with a crepe ratio of about 2.0 to 3.0), or, if an extremely rapid filtering rate is desired, one may use an extremely open or lacy-like creped tissue (having a dryer basis weight of 5 to 7 lbs. per standard ream of 480 sheets 24 by 36 inches, i. e. per 2380 sq. ft., and a crepe ratio of 2.0 to 3.0) such as is used for making multi-ply surgical or sanitary pads or for packing articles to protect them during shipment. The finer and denser the base material is, the higher the extraction ratio, whereas, if one is satisfied with a somewhat less perfect filtrate, or lower extraction ratio, and desires a higher capacity or flow rate, a coarser or more open type of tissue may be employed.

Usually it will be found desirable to employ at least three or four plies of the creped tissue paper base material, in order to obtain a satisfactory extraction ratio. If the tissue is of a very open or lacy type, a greater number of plies will be required to produce a desired extraction ratio than in the case of a denser tissue. Obviously, a filter sheet having the necessary number of individual tissue laminations can be made by using a single web having the required number of individual tissue sheets impregnated before or after assembly, or a plurality of thicknesses of web containing a relatively small number of tissue layers can be combined into a composite web of the desired thickness.

Various substances may be employed as bonding agents, but it is preferred to employ a bonding agent of the resin type, which may be distributed through the body of the filter element by first dissolving, suspending or otherwise dispersing the resin in a liquid vehicle which is used to treat the layer of fibers, preferably after a plurality of plies of tissue have been assembled in the form of a web. Excess liquid is then removed by a suitable drying operation.

Bonding agents in the form of resins of different types or combinations thereof in various proportions may be employed. However, we have obtained the best results with resins which may be rendered plastic or cured by the application of heat at a temperature substantially above any temperature to which the finished filter element will be subjected, but at a temperature less than that which would have a deleterious effect upon the cellulosic fibers of the web. Resins which we have found useful include those resins which are permanently fusible by heat, as well as those resins which may be polymerized or condensed, and which therefore may be deemed resins of the polymerizable or irreversible type as distinguished from the permanently thermoplastic or reversible resins which can be fused at any time merely by application of sufficient heat without polymerization occurring.

It will be understood that, when the bonding agent contains a resin of the irreversible or polymerizable class, one should select a type which can be incorporated with a paper base material as a solution or dispersion and which may be polymerized or condensed, without the use of such pressure as would be customary in the case of many types of such irreversible resins. At the present time, on the market there are a number of resins of the so-called "contact" or low-pressure type which are suitable for this purpose. These resins, which are unsaturated polyesters, may be dissolved or dispersed in water as well as those which require the use of a non-aqueous solvent such as alcohol or xylol, or other non-aqueous liquid.

Where a non-aqueous liquid vehicle is employed, there is less danger of reducing the wet strength or stability of the creped tissue than in the case of an aqueous vehicle. Therefore, the impregnation and handling of the web which has been impregnated with a resin in a non-aqueous vehicle are relatively more simple than in the case of a resin dissolved or dispersed in an aqueous medium. In the latter case, special equipment and precautions should be taken to preserve the crepe structure and to prevent breakage of the web while it is wetted with the aqueous liquid, and until it is reasonably dry.

We find it convenient to assemble the individual plies of the creped tissue to form, preferably, as a continuous web, multi-ply creped tissue fabric having the desired basis weight and number of plies, and then apply the bonding agent by means of an impregnation process. In effecting the impregnation of the multi-ply web, we find it desirable to take special precautions in order to prevent breakage of the web due to the inherent fragility of the tissue, which fragility is accentuated by the web's loss of strength when wetted by the impregnating solution or dispersion. However, as has been stated, it is necessary to conduct all steps in such manner that the wrinkles or corrugations of the individual tissue plies are substantially preserved so as to maintain the bulk and the porosity of the web. Otherwise, the desired filtering rate or capacity will not be obtained. Therefore, excessive pressure should be avoided.

The percentage of resin or other bonding agent with which the base web is loaded will depend upon the type of filtering element which is to be made from the material. The resin may vary within a wide range. In some cases, the resin content may be as low as 10% of the weight of the fiber, whereas, in other cases, it may be desirable to use resin in an amount which, in the finished filter element, represents more than 75% of the weight of the finished filtering element. However, from the standpoint of cost of manufacture, it is obviously desirable to use no more resin than is necessary to obtain the desired results.

If the finished filter element is to be of the rigid or self-supporting type, and no particular flexibility is needed, a relatively high percentage of a hard-setting resin may be used, whereas, if the finished filter element is to be of a type which requires some degree of flexibility to accommodate itself to various conditions, it may be advisable to include an appropriate plasticizer as an ingredient in the resin formula, the percentage of plasticizer used depending upon the degree of flexibility required in the finished filter element.

In some cases, it may be convenient to complete the treatment of the resin-loaded web at the point where the latter is made, whereas, in other cases, it may be desirable to supply the sheet material in uncured or only partially cured condition, so that the filter element manufacturer may set the resin in the filter element after it has been made up into its final form.

In some cases, it may be found advisable to use different types of creped tissue in the same multi-ply web. For example, two or three plies of fine-grained, creped tissue such as toilet tissue may be employed on one side of the web, while on the other side of the web, a much coarser or lacy tissue may be used. Our method of building up the required thickness of web by assembling together from three to twelve sheets or individual plies of tissue enables the web to be readily built up in accordance with the requirements of each individual case.

To facilitate handling and to improve the stability of the finished material, the multi-ply tissue, before impregnation, may be embossed or quilted by the application of heavy pressure to localized areas.

In some cases, a filter thickness or path of the required depth may be made by multiplexing or laying up several plies of the web before the final heat treatment, so that the heat treatment will produce a thick filter-body having sufficient inherent strength or stability to be self-supporting when in service.

Specific example 1

In the production of a filter element which has been effectively employed in the construction of filters for lubricating oils, for example oil filters for internal combustion engines, the filter material may be made as follows:

A multi-ply layer web is first made up by assembling or laying up together about ten sheets of crepe tissue made from sulphite pulp on a Yankee paper machine, each individual sheet or ply having a dryer basis weight of 7.5 lbs. per ream of 2,880 sq. ft., a creping ratio of 2.4, and a reel basis weight of 18.0 lbs. per ream of 2,880 sq. ft.

The ten-ply web may be impregnated or otherwise loaded with the bonding agent, without further processing. When employing resin in an aqueous vehicle, in order to prevent breakage or loss of crepe structure, it is advisable to support the web on a continuous belt or screen of foraminous material, while the web is being treated with the liquid which carries the bonding agent. However, some of the problems involved in handling the wet frangible web without mechanical difficulties may be avoided by embossing or corrugating the web before it enters the impregnating bath. Or, as stated, the difficulties may be reduced by using a non-aqueous vehicle for the resin.

In the particular example selected, the web is corrugated by feeding it through the nip of a pair of pressure rolls, the circumferences of one or both of which, by a turning operation, have been grooved out to form circumferential lands about $\frac{1}{16}$ inch in width and having a center to center spacing of about $\frac{1}{16}$ of an inch, so that the width of each groove between the adjacent lands is about $\frac{1}{8}$ of an inch. These corrugating rolls are about 8 inches in diameter, and there is sufficient pressure applied per lineal inch of roll, so that the desired hydrated or partially hydrated effect is obtained, whereby the plies of the web are in effect permanently united together. Pressures as low as 3 tons per lineal inch and as high as 15 tons per lineal inch have been used, the pressure which is required being, to a considerable extent, influenced by the moisture content of the web.

After the sheets of the web have been quilted together by corrugating in the manner described, the quilted sheet is passed through a bath containing a solution or dispersion of the bonding agent. A formula which has been successfully used consists of 65% of urea formaldehyde resin (Uformite F—200—E), a polymerizable or irreversible resin, and 35% alkyd resin (Paraplex G—20), a permanently fusible or reversible type of resin, dissolved in xylol in such proportions that the solution contains from 20% to 25% of resin solids.

The excess solution is removed by passing the wet web between felt-covered squeeze rolls, using only such pressure as will not change the structural characteristics of the web or of its individual laminations. The impregnated wadding or web is then dried by a current of hot air at a temperature below 100° C., preferably about 95° C. This may be effected in an enclosed festoon dryer suitably safeguarded against danger of explosion, or a drying tunnel of any suitable type.

The dried material is then in the form of a fairly coherent web, which can be wound into rolls and otherwise handled without danger of breakage and will withstand a reasonable amount of pressure without danger of breaking down the structure. It may be made into filter elements by subjecting it to a further heat treatment immediately, or, preferably, it may be shipped in bulk to the manufacturer of the filter elements who makes up or converts the bulk material into elements of the desired size and shape before the final finishing heat treatment.

The final heat treatment, for the purpose of polymerizing that part of the resin which is of the irreversible type, is done by subjecting the material to a temperature of about 125° C. more or less for about 30 minutes. The finished material contains about 30 per cent of total resin.

The amount of flexibility which is desired in the cured or finished filter element may be varied by changing the percentage of total resin or by varying the percentages of the types of resin employed. If a relatively larger percentage of alkyd or other permanently thermoplastic type of resin is used, the flexibility of the finished element is increased, whereas, if a relatively stiff or rigid finished filter element is desired, such greater rigidity or stiffness can be secured by increasing the relative percentage of the urea formaldehyde or other polymerizable or irreversible type of resin in the formula.

*Specific example 2*

In the production of a filter element which has been effectively employed in the construction of filters for lubricating oils, gasoline, Diesel fuel oils, vegetable oils and the like, the filter material is made as stated in the first example except as otherwise specified.

A multi-ply layer web is first made up by assembling or laying up together about seven sheets of crepe tissue, each individual sheet or ply having a dryer basis weight of 5.5 lbs. per ream of 2880 sq. ft., a creping ratio of 2.85, and a reel basis weight of 15.65 lbs. per ream of 2880 sq. ft. The web is not embossed or quilted prior to impregnation.

In this example, the saturant is a solution of water soluble phenol formaldehyde thermo-setting resin of a type capable of being polymerized at a temperature of 160° C. The resin content of the bath is adjusted by the addition of water so that after a mild squeezing, between rolls at a pressure which will permit retaining the unique structure characteristics of the web, and after being dried in a current of hot air, the sheet contains 60% resin by weight. The temperature of the current of drying air is about 245° F. If it is desired to produce an uncured sheet, drying is carried out until the volatile content of the sheet is about 10%. If, on the hand, some degree of cure is desired, the impregnated web may be left in the dryer for a longer period of time, or a higher air temperature may be employed.

In most applications, the final heat treatment will be effected by subjecting the partially fabricated, or completely fabricated filter material to a temperature of about 160° C. more or less for 5 minutes to 60 minutes or more depending upon the shape or thickness of the unit.

We claim:

1. A flexible, multiply sheet product which is resistant to delamination and which is particularly adapted for the manufacture of filters, said product comprising a plurality of superposed sheets of thin, creped cellulosic tissue, the sheets constituting said plies being in a substantially uncompressed condition and contacting each other almost exclusively in the regions where the peaks of the crepes in adjacent plies come together, said product containing a synthetic resin bonding material which is present in such amounts and is so distributed throughout said product that it joins together the individual fibers constituting each of said sheets and provides a very large number of small-dimensioned, spaced-apart, mechanical connections between the plies of said product, the interstices between the constituent fibers of said plies and between said plies being substantially free of resin except for said connections and said connections constituting menisci of resin extending between and connecting adjacent sheets in the regions where the peaks of the crepes in such sheets come together.

2. A flexible, multiply sheet product which is resistant to delamination and which is particularly adapted for the manufacture of filters, said product comprising a plurality of superposed sheets of thin, creped, cellulosic tissue, the sheets constituting said plies being in a substantially uncompressed condition and contacting each other almost exclusively in the regions where the peaks of the crepes in adjacent plies come together, said product containing from 10 to 75% by weight of a synthetic resin bonding material which is so distributed throughout said product that it joins together the individual fibers constituting each of said sheets, and provides a very large number of small-dimensioned, spaced-apart mechanical connections between the plies of said product, the interstices between the constituent fibers of said plies and between said plies being substantially free of resin except for said connections and said connections constituting menisci of resin which extend between adjacent sheets in the regions where the peaks of the crepes in such sheets come together.

3. A flexible, multiply sheet product which is resistant to delamination and which is particularly adapted for the manufacture of filters, said product comprising a plurality of superposed sheets of thin, creped, cellulosic tissue having a basic weight within the range of from about 5 to 10 lbs. for 480 sheets 24 x 36 inches, and a crepe ratio of from about 2.0 to 3.0, the sheets constituting said plies being in a substantially uncompressed condition and contacting each other almost exclusively in the regions where the peaks of the crepes in adjacent plies come together, said product containing a synthetic resin bonding material which is in such amounts and is so distributed throughout said product that it joins together the individual fibers constituting each of said sheets and provides a very large number of small-dimensioned, spaced-apart mechanical connections between the plies of said product, the interstices between the constituent fibers of said plies and between said plies being substantially free of resin except for said connections, and said connections constituting menisci of resin extending between and connecting adjacent sheets in the regions where the peaks of the crepes in such sheets come together.

4. A flexible, multiply sheet product which is resistant to delamination and which is particularly adapted for the manufacture of filters, said product comprising a plurality of superposed sheets of thin, crepe, cellulosic tissue, each having a basis weight within the range of from about 5 to 10 lbs. for 480 sheets 24 x 36 inches, and a crepe ratio of from about 2.0 to 3.0, the sheets constituting said plies being in a substantially uncompressed condition and contacting each other almost exclusively in the regions where the peaks of the crepes in adjacent plies come together, said product containing from 10 to 75% by weight of a synthetic resin bonding material which is so distributed throughout said product that it joins together the individual fibers constituting each of said sheets and provides a very large number of small-dimensioned, spaced-apart mechanical connections between the plies of said product, the interstices between the constituent fibers of said sheets and between said sheets being substantially free of resin except for said connections, and said connections constituting menisci of resin which extend between adjacent sheets in the regions where the peaks of the crepes in such sheets come together.

5. A flexible, multiply sheet product which is resistant to delamination and which is particularly adapted to the manufacture of filters, said product comprising a plurality of superposed sheets of thin, creped, cellulosic tissue, the sheets constituting said plies being in a substantially uncompressed condition and contacting each other almost exclusively in the regions where the peaks of the crepes in adjacent plies come together, said product containing from 10 to 75% by weight of a thermosetting, synthetic resin bonding material which is in a substantially uncured state and which is so distributed throughout said product that it joins together the individual fibers constituting each of said sheets and provides a very large number of small-dimensioned, spaced-apart, mechanical connections between the plies of said product, the interstices between the constituent fibers of said sheets and between said sheets being substantially free of resin except for said connections and said connections constituting menisci of substantially uncured resin which extend between adjacent sheets in the regions where the peaks of the crepes in such sheets come together.

6. The method of manufacturing a filter product of the class described, which consists in the steps of first superposing, without substantial compression, a plurality of sheets of thin, creped, cellulosic tissue whereby said sheets contact each other almost exclusively in the regions where the peaks of the crepes in adjacent plies come together, distributing throughout said superposed tissue sheets a liquid, resinous bonding material, said distribution being effected under conditions which maintain the normal creping and spacing of said sheets existing prior to the resin distributing operation, which distribute the bonding material throughout said sheets, and which cause the formation of a very large number of small-dimensioned, spaced-apart menisci of the resin bonding material between and connecting adjacent sheets in the regions where the peaks of the crepes in such sheets come together, the interstices between the constituent fibers of said plies and between said plies being maintained substantially free of resin except for said connections, and finally heating said resin-containing sheets to dry said product and to cause said resinous bonding material to join together the individual fibers constituting said sheets and said sheets, said final heating operation also being carried out without substantial reduction in the bulk or substantial increase in the unit density of said superposed sheets.

7. The method of manufacturing a filter element of the class described, which consists in the steps of first superposing, without substantial compression, a plurality of sheets of thin, creped, cellulosic tissue whereby said sheets contact each other almost exclusively in the regions where the peaks of the crepes in adjacent plies come together, distributing throughout said superposed tissue sheets a liquid, resinous bonding material, said distribution being effected under conditions which maintain the normal creping and spacing of said sheets existing prior to the resin distributing operation, which distribute the bonding material throughout said sheets, and which cause the formation of a very large number of small-dimensioned, spaced-apart menisci of the resin bonding material between and connecting adjacent sheets in the regions where the peaks of the crepes in such sheets come together, the interstices between the constituent fibers of said plies and between said plies being maintained substantially free of resin except for said connections, drying said resin-containing, interconnected sheets, forming said dried sheets into a filter element, and finally heating said superposed sheets to cause said resinous bonding material to join together said sheets into a strong, permanent structure, said drying, forming and heating operations also being carried out without substantial reduction in the bulk or substantial increase in the unit density of said superposed sheets.

8. A low-density filter product of the class described comprising a plurality of superposed plies of thin, creped, cellulosic tissue which are in a substantially uncompressed condition, and which contact each other almost exclusively in the regions where the peaks of the crepes in adjacent plies come together, the constituent fibers of each of said plies being loaded with a synthetic resin bonding material which is present in such amounts and is so distributed throughout said product that it bonds together the individual fibers constituting each of said plies and unites said plies to each other so as to stabilize the low density structure of said filtering element, the interstices between said fibers and between said plies being substantially free of resin except in the regions where the peaks of adjacent crepes come together.

9. A low-density filter product of the class described comprising a plurality of superposed plies of thin, creped, cellulosic tissue which are in a substantially uncompressed condition, and which contact each other almost exclusively in the regions where the peaks of the crepes in adjacent plies come together, said plies having a basis weight of from about 5 to 10 lbs. for 480 sheets 24 x 36 inches, and a crepe ratio of from about 2.0 to 3.0, the constituent fibers of each of said plies being loaded with a synthetic resin bonding material which is present in such amounts and is so distributed throughout said product that it bonds together the individual fibers constituting each of said sheets and provides a very large number of small-dimensioned, spaced-apart mechanical connections between the plies of said product, the interstices between the fibers of said plies being substantially free of resin except for said connections, and said connections constituting concentrations of resin which extend between and connect adjacent plies in the regions where the peaks of the crepes in adjacent plies come together.

JOHN B. CATLIN.
JOHN C. WOLLWAGE.

REFERENCES CITED

The following references are of record in the file of this patent:

UNITED STATES PATENTS

| Number | Name | Date |
|---|---|---|
| 1,915,339 | Sewall | June 27, 1933 |
| 1,992,215 | Kellett | Feb. 26, 1935 |
| 2,152,901 | Manning | Apr. 4, 1939 |
| 2,170,655 | Fourness | Aug. 22, 1939 |
| 2,228,320 | Magruder et al | Jan. 17, 1941 |
| 2,321,985 | Briggs | June 15, 1943 |
| 2,343,930 | Rowe | Mar. 14, 1944 |
| 2,354,395 | Mason | July 25, 1944 |
| 2,375,246 | Kasten | May 8, 1945 |
| 2,378,477 | Hanley | June 19, 1945 |
| 2,395,301 | Sloan | Feb. 19, 1946 |